United States Patent Office 3,071,139
Patented Jan. 1, 1963

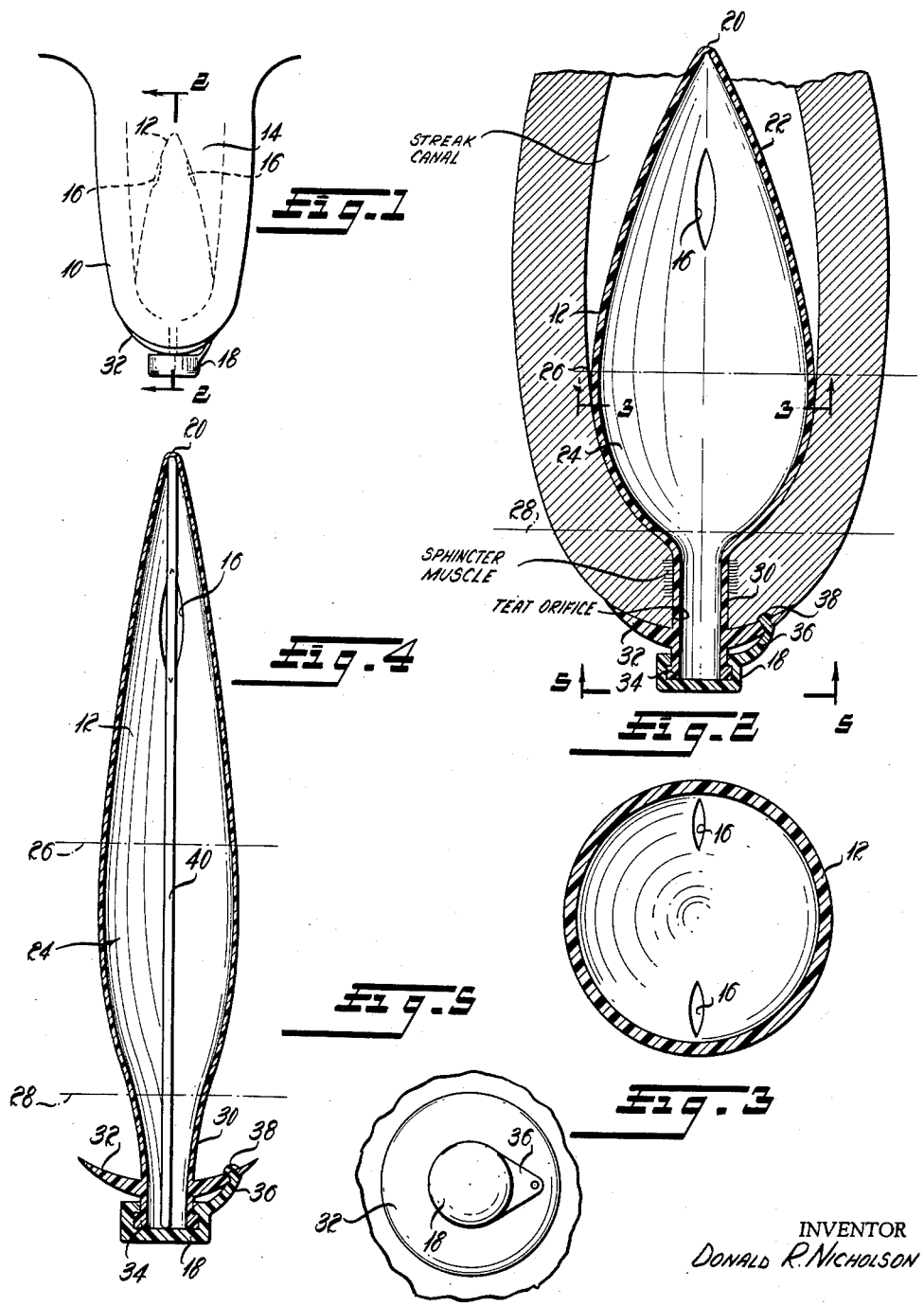

3,071,139
TEAT TUBE
Donald R. Nicholson, Box 247, Westfield, Wis.
Filed Sept. 3, 1959, Ser. No. 837,826
7 Claims. (Cl. 128—350)

This invention relates to tubes adapted to be inserted into the streak canal of the teats of milk cows and goats to aid during the healing of an injured teat.

Teat injuries in milk cows and goats frequently result from the animal stepping on her own teat. This causes either the streak canal to tear loose from the sphincter muscle or the sphincter muscle from the external orifice of the teat. The displacement and swelling that results renders the teat orifice incapable of delivering a stream of milk. Treatment of such teat injuries customarily involves the insertion of a rigid tube, with or without medication, of the type shown in U.S. Patent No. 2,704,076. Such tube, being of a rigid construction, must of necessity be sufficiently small to be insertable through the teat orifice without injury thereto and hence assists very little in holding injured parts of the streak canal in proper position for healing.

It is accordingly a major object of the present invention to provide a novel teat tube which has a stretchable configuration with pliable and somewhat resilient walls to allow a much larger tube than those used previously to be placed in the teat canal for better retention of the tube in its desired position and to better hold an injured teat in place for healing.

Another object of this invention is to provide an improved teat tube where the parts remaining outside the teat are smaller and formed to fit the outer contour of the teat end so that the tube will not be easily caught and inadvertently pulled out by the animal.

A further object of this invention is to provide a stiff rod for slenderizing and supplying rigidity to the tube for easy insertion of the tube into the streak canal. The rod is of a predetermined size to fit into the tube and be held in place by a removable cap on the tube.

These and other objects of the invention will become more fully apparent from the claims and from the description as it proceeds in connection with the appended drawings wherein:

FIGURE 1 is a side elevation view showing the tube of the present invention inserted in the teat of a milk animal such as a cow;

FIGURE 2 is an enlarged front elevation view in section taken along lines 2—2 of FIGURE 1;

FIGURE 3 is a bottom plan view taken along lines 3—3 of FIGURE 2;

FIGURE 4 is a front elevation view of the tube with the rigid rod inserted therein; and FIGURE 5 is a bottom plan view of the cap as viewed along lines 5—5 of FIGURE 2.

Referring now to the drawings, FIGURE 1 is an elevation view of an animal teat 10 showing the novel tube 12 of the present invention in position within the streak canal 14. Tube 12 contains the usual apertures 16 which enable the quarter and teat to be drained. At the bottom near the teat orifice, a snap-on cap 18 is provided. When the cap 18 is in place, the quarter cannot drain, and when cap 18 is removed, milk can be drained, either continuously or at regular milking intervals as may be desired.

Referring now also to FIGURES 2 and 3, tube 12 in its normal configuration is formed with an upper solid pointed end 20 to provide for easy insertion of the tube through the teat orifice. The upper region 22 is generally conical in shape down to the central body portion 24 between dot-dash lines 26 and 28. Central body portion 24 narrows from a point of maximum diameter to neck 30 along a curvature which conforms with the normal contour of the walls of the streak canal to support this portion of the canal in proper position relative to the sphincter muscle. This contour also serves to retain tube 12 in the streak canal and obviates the necessity of having special retaining fingers as are provided in the tube shown in Patent No. 2,704,076.

Neck 30 is generally cylindrical except that a slightly larger diameter is provided at the end adjacent central body portion 24 than at the lower end. This tapered outer wall diameter extends the full length of neck 30 to help retain the tube higher in the sphincter muscle and to compensate for the fact that the tissues at the teat orifice in different cows vary.

Neck 30 extends downwardly through the teat orifice and is provided with flange 32 (see also FIGURE 4) which has an upper surface shaped to match the normal contour of the outer teat surface and a tapered cross section that is thin at the outer edge. This is an important feature of the present invention because cows have a habit of catching tubes of this type with their toes thereby causing the tubes to be inadvertently pulled out.

Beneath flange 32 on neck 30 is an annular ridge 34 which serves as the cap retaining means and over which snap-on cap 18 fits. Cap 18 is formed of a suitable pliable plastic material and has its upper edge beveled to make it easier to snap into position. Cap 18 is formed with a flexible strip 36 having button 38 which fits through an aperture in flange 32. This keeps cap 18 with tube 12 when the cap is temporarily removed from ridge 34 to be readily available for snapping into position.

For certain treatments, it is desirable to have the quarter and teat drain continuously. In that event cap 18 and button 38 are completely removed. Also, to further reduce the chance that the cow may inadvertently cause removal of tube 12, the lower end of neck 12 including ridge 34 may be cut off just beneath flange 32.

The entire tube is preferably made of polyethylene. Such a pliable or flexible material may be formed into the shape of the tube described above in an injection mold to have a wall thickness of the order of .020 inch. The configuration is such that the tube has the properties of being stretchable and sufficiently resilient to return to its initial configuration when having been deformed and the walls at all times remain non-collapsible. The outside diameter of neck 30 must be sufficiently small so that it does not tear or stretch the sphincter muscle. The size used for milking tubes of automatic milking equipment is satisfactory.

As best shown in FIGURE 4, a stiff rod 40, which may be made of a suitable rigid material such as styrene, is provided to be inserted through neck 30 and abut against upper end 20 of tube 12. The lower end of rod 40 is held in tube 12 by cap 18. The length of rod 40 is such that its insertion between end 20 and cap 18 elongates the configuration of tube 12 without permanent deformation to thereby slenderize the tube by reducing the diameter of central body portion 24 to be only slightly larger than the outer diameter of neck 30. Also, this adds sufficient rigidity for insertion purposes. When in the configuration as shown in FIGURE 4, tube 12 is inserted through the teat orifice and sphincter muscle to the desired position in the streak canal. Cap 18 is taken off and rod 40 removed after which tube 12 returns to its original configuration as illustrated in FIGURES 1 and 2. For easy removal of tube 12, rod 40 may again be reinserted as shown in FIGURE 4.

The central body portion 24 has a maximum diameter which is chosen in accordance with the size of the streak canal of the particular animal to be treated. In general this size is at least as great as and preferably greater than two and one half times the outer diameter of neck 30 which is positioned in the teat orifice. For milk cows, the maximum diameter of central body portion 24 I prefer is about 1 cm. and the outer diameter of neck 30 is about 0.35 cm. An inside diameter of neck 30 of about 0.25 cm. is satisfactory to allow insertion of a mastitis tube for medication purposes and for milk draining purposes.

Tube 12 may be made with a longer central body portion 24 than that illustrated for use to hold the walls of the streak canal in cases where the walls are cut through.

One of the important advantages of this construction and configuration is that the central body portion 24 may be much larger than has heretofore been used and be so shaped as to conform to the contour of the walls of the streak canal to hold these walls in proper position for healing while being sufficiently flexible to cause a minimum of damage in case of re-injury.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination, a thin-walled, flexible, tubular member for insertion through a teat orifice and sphincter muscle into the streak canal of a milk animal, comprising: an upper end shaped for easy insertion through the teat orifice and sphincter muscle; a central body portion; a lower section composed of a substantially rigid neck adapted to be retained in a position extending through the teat orifice, said rigid neck being slightly larger at the end nearest the central body portion than at the lower end to help retain the tubular member higher in the sphincter muscle and having an outside diameter adapted to be sufficiently small to prevent tearing or stretching of the sphincter muscle; said central body portion having pliable walls and a bulbous configuration with a normal outer diameter at one region which is larger than the outer diameter of said neck before insertion of said tubular member into the streak canal, said walls being contoured between said neck and said one region to fit along and hold the inner walls of the streak canal in proper position for healing after insertion; means for inserting said tubular member through said teat orifice into said streak canal comprising means for placing said tubular member under axial tension and thereby reducing the diameter of the central body portion to facilitate insertion of the tubular member through the teat orifice, and means for releasing the axial tension on said tubular member after said tubular member has been inserted into the streak canal so that the central body portion will tend to return to its normal shape to thereby hold the streak canal walls at and above the sphincter muscle in proper position.

2. In combination, a thin walled flexible tubular member for insertion through a teat orifice and sphincter muscle into the streak canal of a milk animal, comprising: an upper end shaped for easy insertion through the teat orifice and sphincter muscle; a central body portion; a lower section composed of a substantially rigid neck adapted to be retained in a position extending through the teat orifice and having an outside diameter adapted to be sufficiently small to prevent tearing or stretching of the sphincter muscle and an open inner channel in fluid communication with said central body portion; said central body portion having at one region a normal outer diameter more than two and one half times as large as the outer diameter of said neck before insertion of said tubular member into the streak canal and contoured between said neck and said one region to fit along and hold the inner walls of the streak canal in proper position for healing after insertion, said central body portion having walls made of a pliable material; means for inserting said tubular member through said teat orifice into said streak canal comprising means for placing said tubular member under axial tension so that the outer diameter of the central body portion becomes smaller than its normal size to facilitate insertion of the tubular member through the teat orifice and means for releasing the tube from axial tension after inserting it into the teat so that the central body portion will tend to return to its normal shape to thereby hold the streak canal walls at and above the sphincter muscle in proper position; flange means on the lower end of said neck to retain the tubular member at the desired position in the teat canal; cap retaining means on said neck below said flange means; and a removable cap fitting on said cap retaining means, said means for placing the tubular member under axial tension comprising a rigid rod extending from the upper end of the tubular member through the open inner channel in said neck to said cap, whereby said tubular member may be released from axial tension by removing the cap from the cap retaining means.

3. In combination, a thin walled flexible tubular member for insertion through a teat orifice and sphincter muscle into the streak canal of milk animals comprising: an upper end shaped for easy insertion through the teat orifice and sphincter muscle; a central body portion; a lower section composed of a substantially rigid neck adapted to be retained in a position extending through the teat orifice and having an outside diameter adapted to be sufficiently small to prevent tearing or stretching of the sphincter muscle and an open inner channel in fluid communication with said central body portion; said substantially rigid neck having a gradually tapered outside diameter which is slightly larger at the end nearest the central body portion than at the lower open end to help retain the tubular member higher in the sphincter muscle; said central body portion having at one region a normal outer diameter more than two and one half times as large as the outer diameter of said neck before insertion of said tubular member into the streak canal and contoured between said neck and said one region to fit along and hold the inner walls of the streak canal in proper position for healing after insertion, said central body portion having walls made of a pliable material; means for inserting the tubular member through said teat orifice into said streak canal comprising means for placing said tubular member under axial tension so that the outer diameter of the central body portion becomes smaller than its normal size to facilitate insertion of the tubular member through the teat orifice and means for releasing the tubular member from axial tension after inserting it into the teat so that the central body portion will tend to return to its normal shape to thereby hold the streak canal walls at and above the sphincter muscle in proper position; and flange means on the lower end of said neck.

4. The combination of claim 1 including flange means adjacent the lower end of said neck curved to match the outside contour of said teat and adapted to be contiguous thereto when the central portion of said tubular member is disposed within said streak canal, said flange means having a tapered cross-section and having its thinnest dimensions at its outer edge to reduce the likelihood of the tubular member being inadvertently displaced from its inserted position.

5. The combination of claim 1 wherein said neck has an exteriorly opening inner channel in fluid communication with said central body portion, said central body portion is in fluid communication with said upper end portion, and said upper end portion is apertured, whereby milk may drain from said streak canal through said tubular member to the exterior of said teat.

6. The combination of claim 1 including cap retaining means on the lower end of said neck, a removable cap adapted to fit on said cap retaining means, and means for securing said cap to said cap retaining means.

7. The combination of claim 6 wherein the means for inserting the tubular member into the streak canal comprises a rigid rod extending from the upper end of said tubular member through said central body portion and said neck into engagement with the interior of said cap, said rod being removable from said tubular member to allow the latter to return to its normal configuration.

References Cited in the file of this patent

UNITED STATES PATENTS

| | | |
|---|---|---|
| 1,688,795 | Aas | Oct. 23, 1928 |
| 1,797,339 | Gudmand-Hoyer | Mar. 24, 1936 |
| 2,704,076 | Larson | Mar. 15, 1955 |

FOREIGN PATENTS

| | | |
|---|---|---|
| 5,445 | Great Britain | May 16, 1891 |